May 23, 1933.     E. SEYFFERT     1,910,263

ROTARY DRYING DRUM

Filed May 2, 1931

Inventor:

Eduard Seyffert

Patented May 23, 1933

1,910,263

UNITED STATES PATENT OFFICE

EDUARD SEYFFERT, OF DUSSELDORF, GERMANY

ROTARY DRYING DRUM

Application filed May 2, 1931, Serial No. 534,559, and in Germany May 11, 1930.

This invention relates to a rotary drum particularly for drying granular or like materials, and consists in providing the drum with longitudinally arranged, parallel racks connected to transverse, parallel carrier bars and aligned in two directions at right angles to each other, adjacent rows of racks being spaced from one another and having their racks arranged in relatively staggered positions.

By this arrangement the materials, on travelling from rack to rack, will be uniformly distributed throughout the cross-sectional area of the drum so that the drying will be rapid and thorough and the heat utilized to the best advantage.

Figure 1:
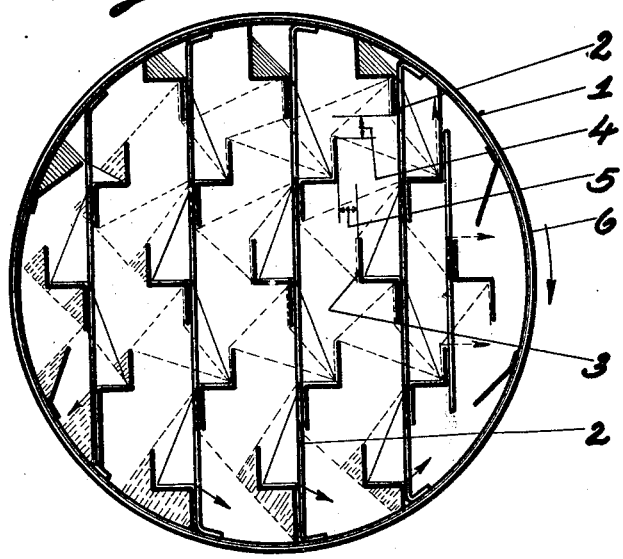
Figure 2:
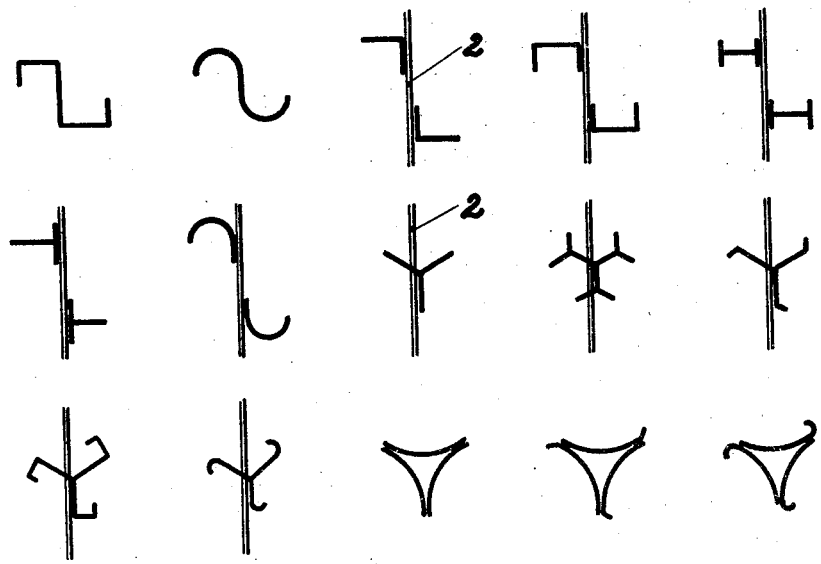

Fig. 1 of the accompanying drawing represents a cross-section of a drying drum according to the invention, and Fig. 2 represents a series of cross-sections showing different modifications of the racks.

The rotatable drying drum 1 is fitted with transverse, parallel carrier bars 2 to which longitudinally arranged, parallel racks 3 are connected. The racks, which may be of S or Z-shaped or of any other suitable cross-section, as shown in Fig. 2, are aligned across as well as parallel to the bars and in two directions at an oblique angle to the bars, adjacent rows having their racks in relatively staggered positions so that the racks will be uniformly distributed throughout the cross-sectional area of the drum. Adjacent rows of racks are spaced, so that the extreme opposing edges of the racks of adjacent rows will be situated along lines which are spaced from each other, as shown at 4 and 5, so as to provide the material with clear, through falling spaces.

On the drum rotating in the direction of the arrow, the materials drop in uniformly distributed, thin streams from rack to rack, as indicated by arrows and dotted lines in Fig. 1, and travel through all parts of the drum. In this manner the materials will be uniformly dried, and the heat applied to the drum will be utilized to its full extent.

The bars and racks are interconnected by means of screws or the like so as to allow of being easily detached for cleaning and for renewal. The bars 2 are connected to the drum wall either direct or through the medium of rings 6. In the latter instance racks and bars may form an independent structure which can be removed as a whole from the drum.

The drum may be used for cooling and calcining purposes as well as for drying.

I claim:

1. A rotatable drying and like drum containing transverse, parallel carrier bars, and longitudinally arranged parallel racks connected to said bars and aligned across as well as parallel to the bars and in two directions at an oblique angle to the bars and relatively staggered in adjacent rows, the extreme opposing edges of the racks of adjacent rows being in each direction situated along lines which are spaced from each other to provide the material with clear, through falling spaces.

2. A drum as claimed in claim 1 wherein the carrier bars and racks are interconnected to form an independent structure adapted to be removed as a whole from the drum.

EDUARD SEYFFERT.